E. C. COOK.
COTTON PICKER.
APPLICATION FILED APR. 28, 1911.
1,032,115.
Patented July 9, 1912.
3 SHEETS—SHEET 1.
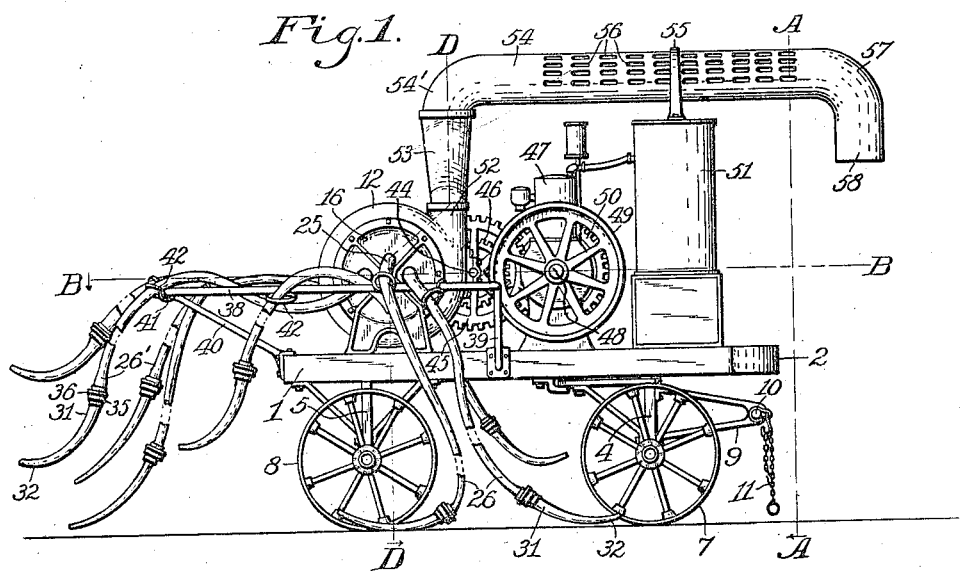
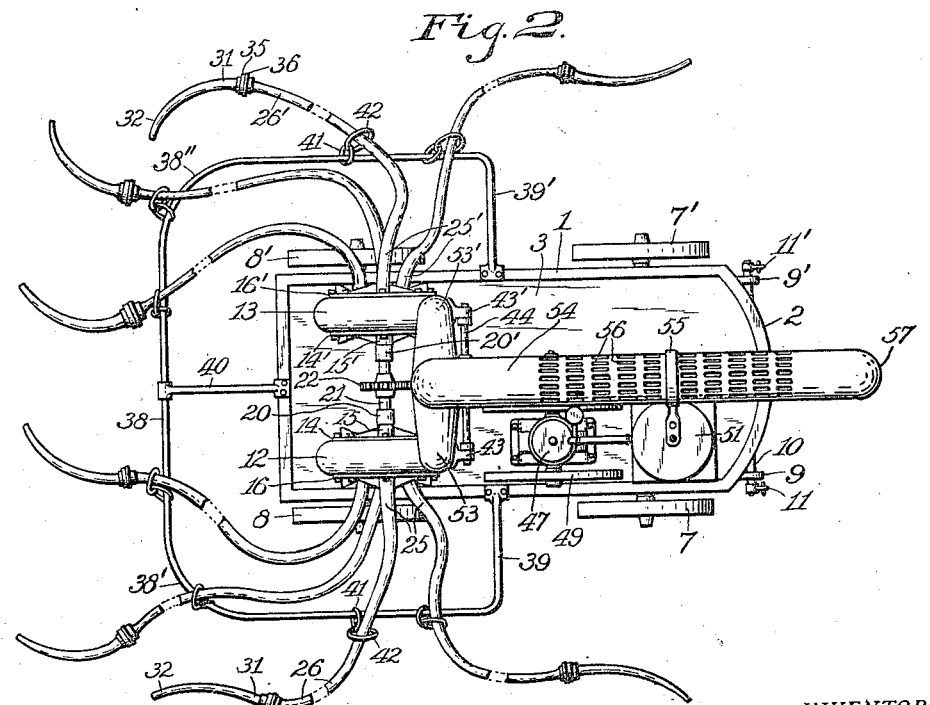
WITNESSES:
J. H. Gardner.
G. W. Poyner.
INVENTOR:
Elbridge C. Cook,
BY
E. T. Silvius,
ATTORNEY.

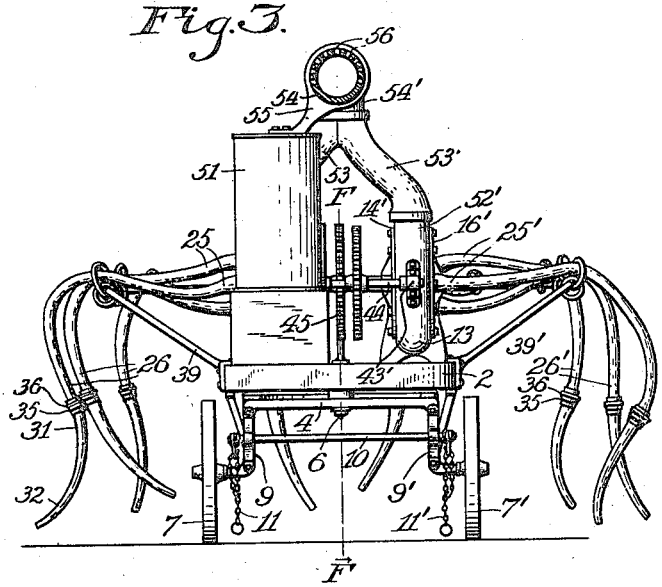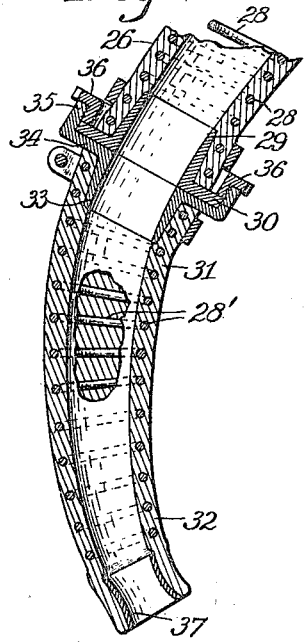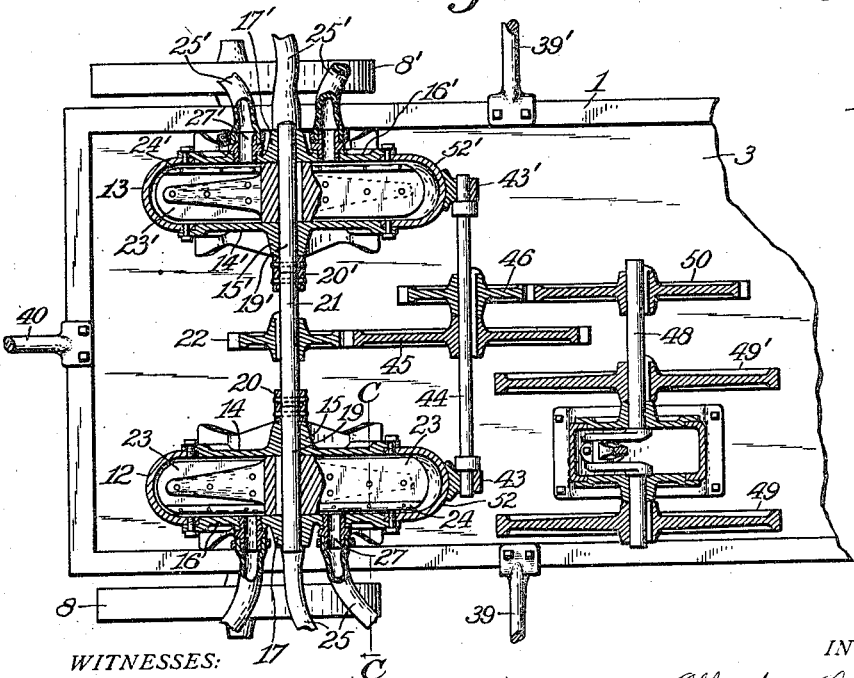

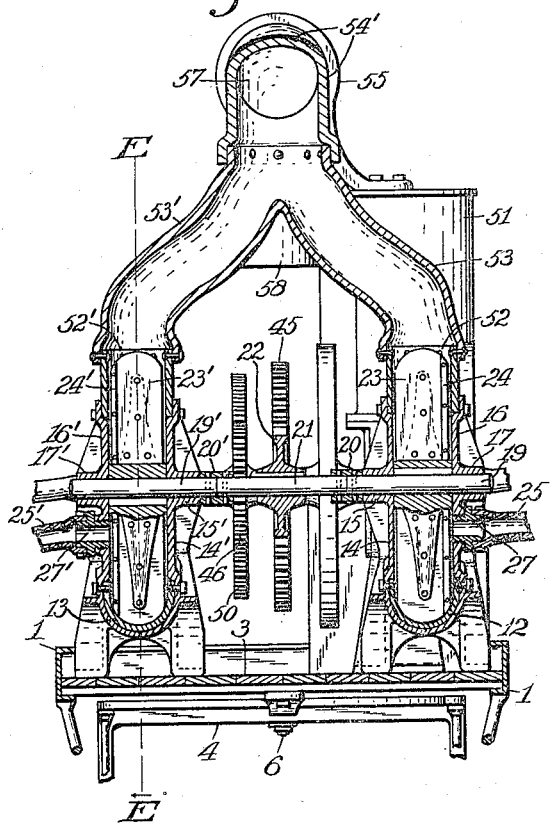
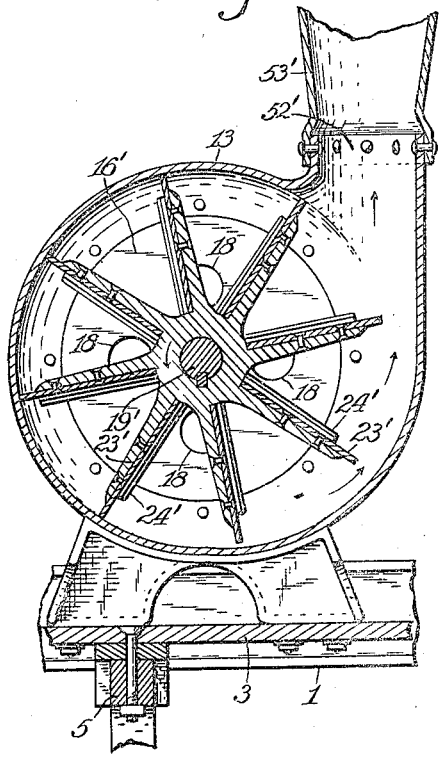
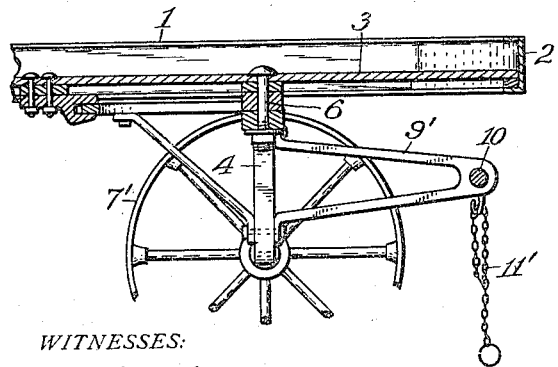

UNITED STATES PATENT OFFICE.

ELBRIDGE C. COOK, OF INDIANAPOLIS, INDIANA, ASSIGNOR OF ONE-HALF TO JOHN W. STOKES, OF INDIANAPOLIS, INDIANA.

COTTON-PICKER.

1,032,115.      Specification of Letters Patent.      Patented July 9, 1912.

Application filed April 28, 1911. Serial No. 623,972.

*To all whom it may concern:*

Be it known that I, ELBRIDGE C. COOK, a citizen of the United States, residing at Indianapolis, in the county of Marion and State of Indiana, have invented a new and useful Cotton-Picker, of which the following is a specification, reference being had to the accompanying drawings and to the letters and figures of reference marked thereon.

This invention relates to cotton picking machines of the type that is designed to be guided and controlled by human agency, the invention having reference more particularly to cotton pickers that are designed to remove the cotton from the bolls in the fields by the vacuum or a suction process.

The object of the invention primarily is to provide improved means for expeditiously picking cotton without injury to the fiber thereof, a further object being to provide a reliable and relatively inexpensive cotton picker that will be adapted to be easily drawn by animals through the fields and also capable of being economically operated and without being liable to derangement in use.

With the above mentioned and minor objects in view the invention comprises a truck adapted to be hitched to a wagon and provided with a plurality of combined suction and blowing fans arranged and geared together in a novel manner and having suction tubes of novel construction and arrangement, a pipe connected with the fans for discharging the cotton into the wagon, and an engine or motor connected with the fans for simultaneously operating them; the invention consisting further in the novel parts and in the combinations and arrangements of parts as hereinafter particularly described and claimed.

Referring to the drawings, Figure 1 is a side elevation of the improved cotton picker; Fig. 2, a top plan of the machine; Fig. 3, a sectional elevation on the line A A in Fig. 1; Fig. 4, a fragmentary sectional view of one of the suction tubes; Fig. 5, a fragmentary section on the line B B in Fig. 1; Fig. 6, a fragmentary vertical section on the plane of the line C C in Fig. 5; Fig. 7, a fragmentary section approximately on the line D D in Fig. 1; Fig. 8, a fragmentary section on the plane of the line E E in Fig. 7; Fig. 9, a fragmentary section on the line F F in Fig. 3; and Fig. 10, a fragmentary inverted plan of the forward portion of the truck.

Similar reference characters in the different figures of the drawings indicate like parts or features of construction herein referred to.

The invention as preferably constructed comprises a suitable frame 1 having a rounded forward end 2 adapted to abut the rear end of a wagon body, the frame being provided with a floor 3 so as to constitute a platform and which is supported by two arch axles 4 and 5, the latter being secured fixedly to the platform, the forward axle 4 being connected to the platform by means of a center-pin 6 and is provided with a pair of wheels 7 and 7'; the rear axle 5 being provided with a pair of wheels 8 and 8'. The forward axle 4 is provided with two V-shaped draw-bars 9 and 9' arranged near the wheels and which preferably are connected together at their ends by means of a tie rod 10 to which draft chains 11 and 11' are connected which are adapted to be connected to the rear axle of a wagon.

A plurality of fans are mounted upon the platform, there being two illustrated, and they comprise two shells 12 and 13 arranged in parallel order and convenient distance apart, the adjacently arranged side plates 14 and 14' of the shells being provided with journal-boxes 15 and 15' respectively and are otherwise imperforate. The farther or outer side plates 16 and 16' of the shells are provided with journal-boxes 17 and 17' respectively, and each plate has a suitable number of inlet openings 18 therein arranged about the journal-boxes through which to receive the cotton. A shaft 19 is rotatably mounted in the journal-boxes 15 and 17 and is provided with a coupling 20. a similar shaft 19' being mounted in the journal-boxes 15' and 17' and provided with a coupling 20', the couplings being adjacent the journal-boxes 15 and 15', said shafts being in alinement, and an extension shaft 21 is secured to the two couplings so that the two shafts 19 and 19' are practically one shaft and obviously may be so made if desired. A pinion 22 is secured to the shaft 21 for driving the two fans which comprise a suitable number of fan blades 23 mounted on the shaft in the shell 12 and similar blades 23' mounted on the shaft in the shell 13, the blades having rounded or blunt edges 24 and 24', presented toward the side plates of the shells that have the inlet openings therein, in order to avoid injury to the cotton as it is drawn into the shells and at times against the opposing edges of the blades.

A suitable number of suction tubes are connected to the outer sides of the fans, each tube preferably being tapering slightly from end to end, the larger end portions 25 or 25' being connected to the side plates at the inlet openings and the smaller end portions 26 or 26' being adapted to be carried about by an attendant so as to gather the cotton, each tube preferably having a nipple 27 or 27' in its larger end, the nipple being screwed into the inlet opening. The tubes are made of suitable composition and preferably have coiled wire 28 therein to prevent the tubes from collapsing under suction. Preferably each tube is provided with a curved and rotatively adjustable inlet end portion, the adjustability preferably being accomplished by means of a ferrule 29 forced into the end portion 26 of the tube and having a joint flange 30 thereon; a flexible curved inlet end portion which contains a stiffening wire coil 28' has a larger end portion 31 and a smaller inlet end portion 32, the end portion 31 having a ferrule 33 forced therein that has a flange 34 thereon adapted to turn against the flange 30, a cylindrical barrel 35 extending from the flange 34 and having a retaining ring 36 secured therein for retaining the joint flanges in contact and permitting the flange 34 to turn relatively to the flange 30. The smaller end portion 32 has a ferrule 37 in its orifice to protect the rubber composition of which the tube is composed. The suction tubes are made in suitable lengths so that the cotton may be gathered at the rear and also at the sides of the truck as it is drawn along the ground, the curved adjustable end portions being carried by attendants, and in order to support the middle portions of the suction tubes a rail 38 is provided which extends across beyond the rear and along opposite sides of the platform in a plane somewhat higher than the platform, and it has curved corner portions 38' and 38" and is bent near its ends to form supporting arms 39 and 39' which are secured to opposite sides of the frame 1, a supporting arm 40 being mounted on the rear end of the frame 1 and supporting the rearward portion of the rail. A suitable number of rings 41 are arranged loosely on the rail, each ring having another ring 42 connected thereto through which a suction tube extends. The tubes are illustrated as resting upon the rail and it is obvious that if desired they may extend under the rail and rest in the rings.

A pair of journal-boxes 43 and 43' are secured to the exterior of the shells 12 and 13 of the fans, preferably near the outlet portions thereof, and they rotatably support a countershaft 44 to which a gear wheel 45 is secured which meshes with the pinion 22. A gear wheel 46, which is relatively smaller than the wheel 45, is secured also to the countershaft 44. A suitable engine 47 of the explosion type using oil as fuel is mounted on the platform with its crank shaft 48 arranged parallel to the counter shaft 44, the crank shaft preferably having fly-wheels 49 and 49' thereon, and a relatively large gear wheel 50 is secured to the crank shaft 48 and meshes with the relatively smaller gear wheel 46. The gearing as will be seen is adapted to enable the engine, which may run at high speed, to drive the fans at great velocity in order to produce suction in a relatively large number of suction tubes. The engine is provided with a suitable fuel tank 51. The outlet portions 52 and 52' of the shells 12 and 13 respectively are provided with discharge pipes 53 and 53' respectively which are connected to a horizontal discharge pipe 54 which has an elbow 54' to which the upper ends of the upwardly extending pipes 53 and 53' are directly connected. The main portion of the pipe 54 is suitably supported, preferably by means of a saddle 55 mounted on the tank 51. The upper portion of the pipe 54 has a suitable number of perforations 56 therein to permit the escape of some of the air which carries the cotton through the pipe. The pipe is sufficiently long to extend forward beyond the vertical plane of the forward end of the platform and has a down turned elbow 57 provided with an outlet end 58 adapted to direct the cotton down into the wagon to which the truck may be hitched.

In practical use the cotton picking machine is drawn behind a wagon having sufficient capacity to haul a considerable quantity of cotton, and the engine 47 being operated drives the countershaft 44 and it in turn drives the fans which draw air through the suction tubes and discharge the air through the pipe 54. Attendants carry the adjustable end portions of the suction tubes and turn them or adjust them so as to conveniently place the inlet ends 32 to the ripened cotton on the plants, the curved portions being turned so as to reach downwardly to relatively low stalks when necessary or in either direction laterally for convenience. The suction produced by the rapidly moving fan blades draws the cotton through the suction tubes into the shells 12 and 13 from which the air and cotton is expelled through the tubes 53 and 53' and then sent into the pipe 54 from which some of the air escapes through the apertures 56, taking with it any dust that may be present therewith and reducing the force of the blast so that the cotton shall not be blown out of the pipe into the wagon with unnecessary force. It will be apparent that each attendant may control two suction tubes, so that in the present case with eight tubes and four attendants a large amount of cotton may be picked with each passage of the machine across the field, and the range of action being relatively wide, fewer trips are required and proportionate loss of time saved in turning at the ends of the trips.

Having thus described the invention, what is claimed as new is—

1. A cotton picker including a shell, a shaft rotatably mounted in the shell, a plurality of suction-tubes connected with one side of the shell at different portions thereof distant from the shaft for discharging the cotton in relatively small quantities into different portions of the shell, and thin fan blades carried by the shaft for drawing the cotton forcibly into the shell, edges of the blades being presented toward the incoming cotton, said edges being thickened and having rounded portions facing toward said side of the shell.

2. A cotton picker including a movable platform, a plurality of suction-producing blowers and also an engine mounted on the platform, the blowers being arranged uprightly with their backs adjacently one to another in parallel order on the rear portion of the platform and having outlet tubes extending upward from their sides that are toward the engine, gearing connecting the plurality of blowers to the engine, a plurality of suction-tubes connected independently to the outer or farther sides of the blowers, and a discharge-pipe connected with the plurality of tubes and extending with the plurality of tubes and extending above the plane of the top of the engine to a plane beyond the forward end of the platform, the end of the discharge-pipe extending downward beyond the engine.

3. In a cotton picker, the combination of a platform, two circular shells oppositely arranged uprightly on the platform and having each a journal-box on the exterior thereof, suction-tubes connected to the two shells respectively, a discharge-pipe connected with the two shells, a shaft rotatably mounted in the two shells, two series of fan blades on the shaft, one series being in one shell and the other series in the other shell, a pinion secured to the shaft between the shells, an engine mounted on the platform, the engine having a rotatable shaft, a counter-shaft mounted in the journal boxes, a drive-wheel secured to the rotatable shaft, a gear wheel secured to the counter-shaft and engaging the pinion, and a wheel secured to the counter-shaft and operatively connected with the drive wheel.

In testimony whereof, I affix my signature in presence of two witnesses.

ELBRIDGE C. COOK.

Witnesses:
  P. A. HAVELICK,
  E. T. SILVIUS.